United States Patent [19]

Critchlow

[11] Patent Number: 5,282,226
[45] Date of Patent: Jan. 25, 1994

[54] SYSTEM AND METHOD FOR TRANSMISSION OF BURSTS OF DIGITAL INFORMATION

[75] Inventor: David N. Critchlow, San Diego, Calif.

[73] Assignee: Hughes Aircraft Company, Los Angeles, Calif.

[21] Appl. No.: 874,444

[22] Filed: Apr. 27, 1992

[51] Int. Cl.[5] .......................................... H04L 27/04
[52] U.S. Cl. .................................... 375/59; 332/103
[58] Field of Search .................. 375/60, 11, 39, 59, 375/67; 379/59; 455/33.1; 332/103, 106

[56] References Cited

U.S. PATENT DOCUMENTS 5,164,963  11/1992  Lawrence et al. .................. 375/39

Primary Examiner—Curtis Kuntz
Assistant Examiner—Tesfaldet Bogure
Attorney, Agent, or Firm—Gordon R. Lindeen, III; William J. Streeter; Wanda Denson-Low

[57] ABSTRACT

A mobile station cellular telephone transmitting system having a digital data source, waveform map, FIR filter with eight taps, a zero force circuit, start/end burst detection circuit, quadrature modulator, upconverter, and power amplifier. The ramping of the power output at the beginning and end of each frame slot or burst is controlled by forcing the first and last symbol of the burst's FIR filter output to zero.

19 Claims, 6 Drawing Sheets

SYSTEM AND METHOD FOR TRANSMISSION OF BURSTS OF DIGITAL INFORMATION

BACKGROUND OF THE INVENTION

1. Field of Invention

The present invention relates to the digital transmission of information; and more particularly, to a system and method for transmitting successive bursts of digital information. Although the present invention is suitable for use in many different types of communication systems, it is particularly advantageous in cellular communication systems for transmitting frames of digital information; and is herein described in connection therewith.

2. Discussion of Related Art

A cellular communication system is a mobile telephone service wherein radio coverage is divided into cells. Each cell is assigned a number of available radio frequencies. The same frequencies or channels used in one area or cell are also used for areas that are spatially separated from one another. A mobile telephone station transmits and receives control and voice communication information from a base station within the same cell. The base stations are controlled by a cellular system switching and control network that provides connection with the world wide telecommunications network. A call in progress is not interrupted as the mobile station travels from one cell location to another, since the system provides for automatic reassignment to an available channel within the other cell. Some of the assigned channels are used for control functions, such as locating a mobile station, for example, and the remaining channels for voice communication.

In order to provide superior non-interfering transmission and reception, as well as compatibility among many different mobile stations and base stations in different parts of the world and the capability of communicating with the world wide telephone network, various operational and material specifications and standards were developed to which all suppliers and users are obliged to follow.

A mobile station that operates in the digital mode is required to use an RF band which is divided into two separate 25 MHz wide segments, each consisting of 832 individual channels. The first segment contains the mobile station transmit channels and the second segment, the mobile station receive channels. The effective maximum radiated power (ERP) for various classifications of mobile stations is required to be from 0.6 watts to 4 watts depending on the classification.

Also, each channel for digitally transmitting information is required to have a frame format; that is, each channel radiates a succession of frames, each of which has a duration of forty milliseconds, and constitutes one cycle of a regularly recurring series. Each frame has six slots and each slot has 162 symbols and a duration of 6.67 milliseconds. Each symbol is made up of 2 bits of data. Each slot contains a separate burst of RF energy that is required to ramp up to peak power during a predetermined number of symbols at the beginning of each slot and ramp down to zero power during a predetermined number of symbols at the end of each slot.

It has been determined that an RF power output of a digital channel that increases or ramps up, or decreases or ramps down, from a peak value, at too great a rate at the beginning and end of a slot causes spectral splattering of the transmitted signal; and an RF power output that ramps up or down at too slow a rate results in an overlapping of the slots and undesired interference between two user's slots.

It has been determined by the cellular standards committee that transmission is to be effected by ramping up to a peak voltage at the start of each burst during the first three symbols of a slot; and a ramping down of the burst voltage at the end of each burst beginning during the last three symbols of the slot.

Conventionally, a transmitter that has a digital channel and a frame format has six bursts per slot with only one mobile station using the channel at any one time. In such a system, a 6 tap spectral filter can be used that typically has coefficients sufficient to effect a peak power ramp up within the first three symbols, and a power ramp down from peak power within the last three symbols of a burst.

It has been proposed to allow multiple users to share common channels in order to increase the capacity of the system. For example, three different users may use alternate slots of each frame. The sharing of each frame tends to cause an overlap of the data of the slots, which creates noise and inferior communication.

In order to improve the spectral response of a shared channel, a finite impulse response filter having a greater number of taps is utilized. However, this advantage is offset by the slower ramp up time to peak power and the slower ramp down time from peak power for each burst. Thus, since optimum ramp up or down is not feasible with the more resolute filter, a separate ramp generator is required to be connected to the output power amplifier in order to conform to the desired standard and provide optimum ramping of the power output.

SUMMARY OF THE INVENTION

One of the advantages of the present invention is a system and method for transmitting digital information wherein the optimum ramping of the RF voltage of the individual bursts is accomplished in a relatively simple and cost-effective manner.

Another advantage of the present invention is a transmitter and method for increasing the resolution of spectral filtering of digital information without deviating from the optimum ramping of the RF output power of frames commonly shared by a plurality of transmitters.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention is a system for transmitting successive bursts of digital information containing multiple symbols, each burst ramping up from zero power output to a peak power output and ramping down from the peak power output to zero power output at a respective beginning and ending of each burst, said system comprising a digital data source for generating data corresponding to at least one of coded voice and control information; symbol mapping means coupled to the digital data source for generating a series of symbols having in-phase (I) and quadrature phase (Q) components corresponding to the generated data, filtering means coupled to the symbol mapping means for spectrally filtering the series of I and Q symbol components, detecting means coupled to the filtering means for detecting a start of a ramp up and a ramp down of each burst; zero forcing means coupled to the filtering means and the detecting means for forcing predetermined symbols to a zero value to control ramping up and ramping down of the power output; modulating means coupled to the zero forcing means for modulating the filtered symbols of each burst; and means including a power amplifier for outputting modulated symbols.

In another aspect, the invention comprises, a method for transmitting successive bursts of digital information in a communication system, at a power output that is ramped up at the beginning of each burst and ramped down at the end of each burst, comprising the steps of: generating digital data corresponding to at least one of coded voice and control information; generating in phase (I) and quadrature phase (Q) components corresponding to the generated digital data; filtering spectrally the I and Q symbols; and controlling preselected filtered symbols of each burst for determining the ramping of the transmitted output power.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Figure 1:
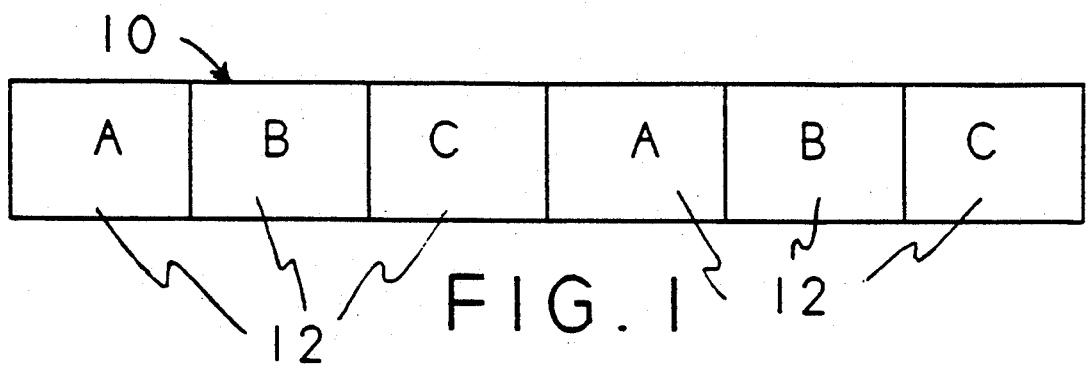
FIG. 1 depicts schematically a frame of a digital communication channel generated by a system incorporating the present invention.
Figure 2:
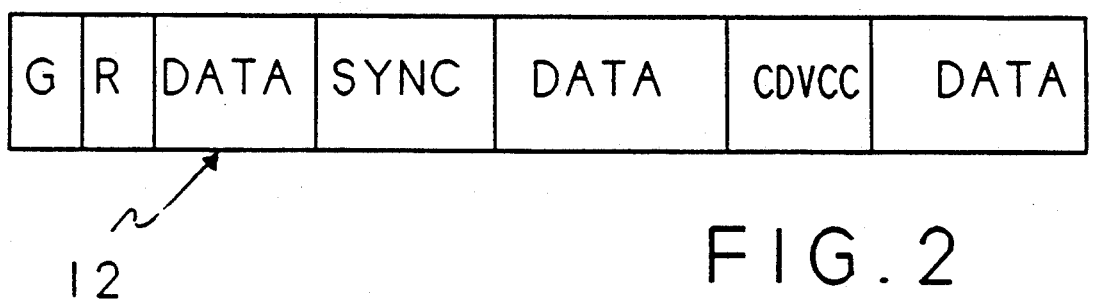
FIG. 2 depicts schematically one of the slots of the frame of FIG. 1.

Prior to discussing the system and method of the present invention; a description of the frame and slot protocol utilized in connection with a cellular system will be briefly described in connection with FIGS. 1 and 2 in order to better understand the invention. FIG. 1 illustrates a frame of information generally referred to at 10, which is transmitted every forty milliseconds or at a rate of 25 frames per second. Frame 10 has six slots, referred to as slots 12. Of the slots 12, two slots A may be used by one mobile station, two slots B another, and two slots C by a third station or subscriber for carrying on conversations simultaneously. Each slot represents an individual burst of RF energy of a duration of 6.67 milliseconds. Referring to FIG. 2, one of the slots 12 has several fields, a guard time field G, a ramp time field R, a synchronization field SYNC, a sixteen bit data channel, two data channels of one hundred twenty-eight bits each, and a coded digital verification color coded slot CDVCC. The slot ramps up from zero output to peak output voltage at the beginning of each slot as shown at R and ramps down from the peak voltage at the end of each slot (not shown). The guard time portion is between individual bursts of each slot.

Reference will now be made in detail to the present preferred embodiment of the invention, an example of which is illustrated in the accompanying drawings. Wherever possible, the same reference numbers will be used throughout the drawings to refer to the same or like parts.

The system of the present invention comprises a transmitter that has a data source, a waveform map, a finite impulse response filter, a zero force circuit, a start/end burst detection circuit, a quadrature modulator, an upconverter, a power amplifier and an antenna.

Figure 3:
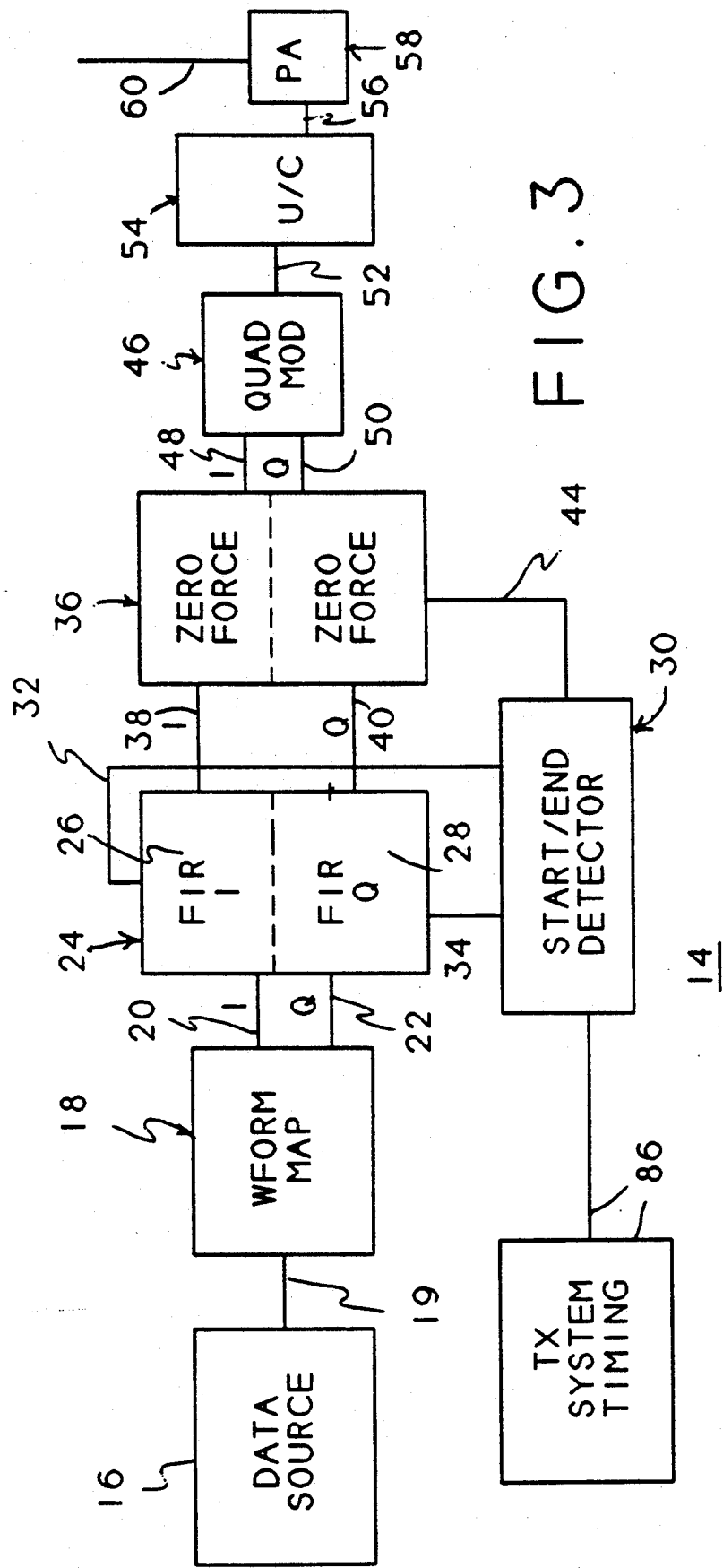
FIG. 3 is a schematic block diagram of a digital portion of a transmitter incorporating the present invention.

Referring to FIG. 3, and as embodied herein, a transmitter generally referred to as 14 is configured to produce successive bursts of digital information, each of which ramps up and ramps down RF output power at the beginning and end of each burst during the occurrence of a predetermined number of symbols. Transmitter 14 comprises a data source 16 for generating digital data corresponding to coded control and/or voice information. A waveform mapping device 18 has an input 19 from the data source and converts digital data to in-phase (I) and quadrature phase (Q) components at outputs 20 and 22, which are input to a filter 24, which is a preferably a finite impulse response (FIR) filter, having I and Q sections 26 and 28 for filtering out the sidelobes of the I and Q components. As herein embodied, filter sections 26 and 28 each have preferably eight stages or taps. Start/end burst detecting circuit 30 is connected to outputs 32 and 34 of filter sections 26 and 28 for detecting the start of a ramp up or ramp down of each burst.

In accordance with the invention, zero forcing means is coupled to filtering means for forcing predetermined symbols to zero value to control ramping up and ramping down of the power output. As herein embodied, zero forcing circuit 36 has inputs 38 and 40 connected to filter sections 26 and 28, and input 44 connected to output 44 of start/end detection circuit 30 for controlling the symbol values applied to a quadrature modulator 46 over lines 48 and 50. The modulator 46 has an output 52 connected to upconverter 54 for increasing the frequency of the output, which in turn is connected to input 56 of power amplifier 58. An antenna 60 radiates the bursts of power from the power amplifier.

For the cellular application of the present invention, data source 16 provides digital data in the form of 2-bit symbols which are modulated into a differential quadrature phase shift key (DQPSK) waveform. The data can contain coded voice and/or control information represented by 00, 01, 10, or 11, input to waveform map 18 for conversion into in-phase (I) and quadrature phase (Q) components that correspond to 8 possible phase numbers or values in accordance with the following table of values.

| I | Q | Phase # |
|---|---|---|
| 1.0 | 0 | 1 |
| .707 | .707 | 2 |
| 0 | 1.0 | 3 |
| −.707 | .707 | 4 |
| −1.0 | 0 | 5 |
| −.707 | −.707 | 6 |
| 0 | −1.0 | 7 |
| .707 | −.707 | 8 |

Figure 4:
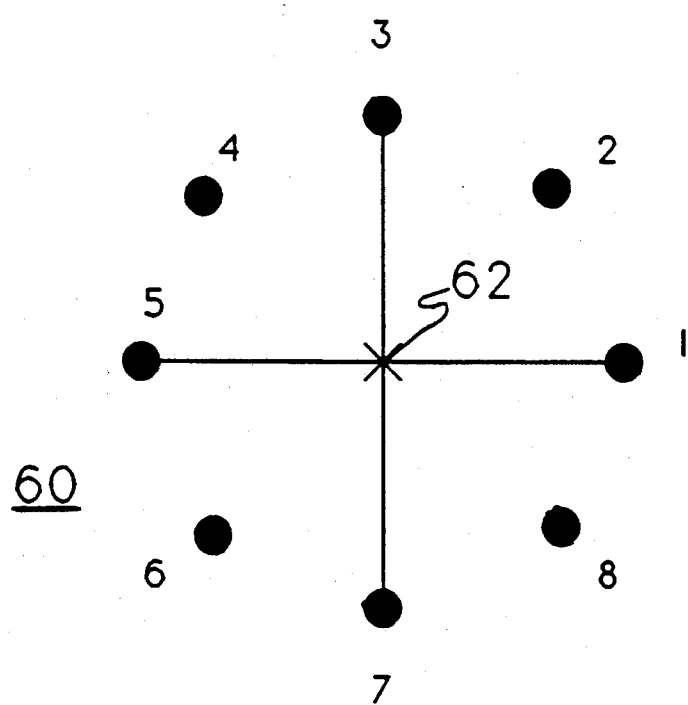
FIG. 4 is a graphical representation of the phases of a waveform map for forming I and Q components.

Referring to FIG. 4, a graph 60 depicts the eight possible coordinate locations which correspond to the I and Q values of the above table. When both I and Q values are at zero amplitude, the location is at the junction 62 of the coordinates.

Figure 5:
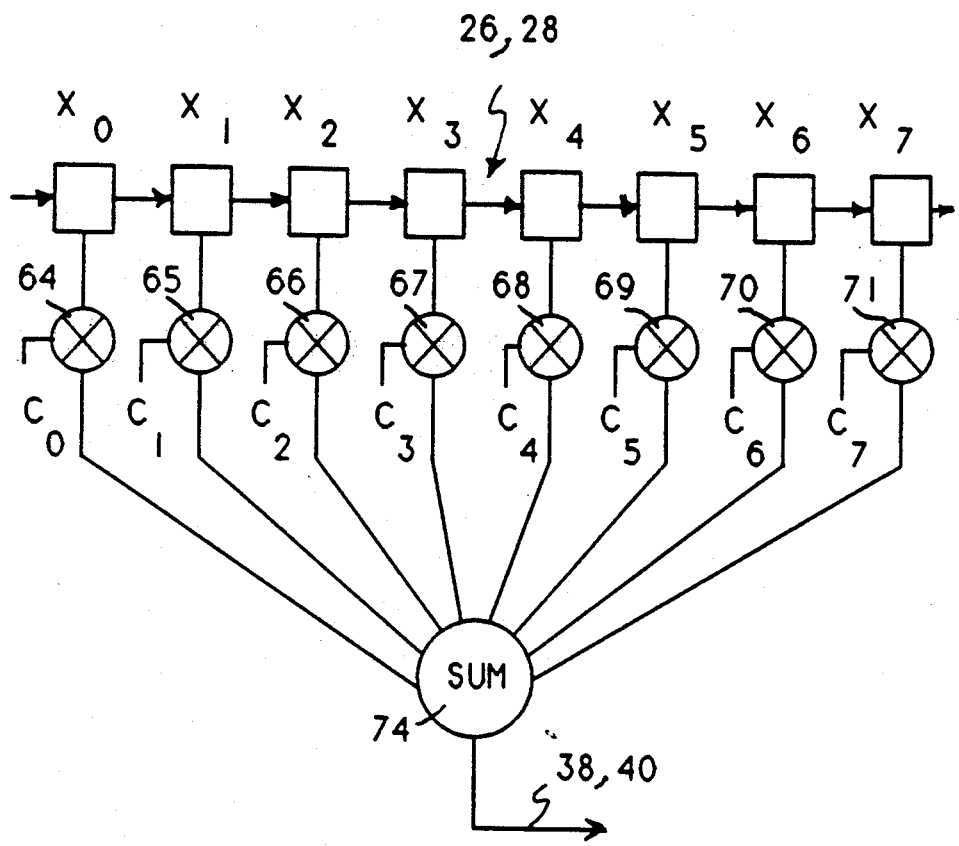
FIG. 5 is a schematic diagram of a finite impulse response (FIR) filter of the system and method of the present invention.

Filter 24 is illustrated in FIG. 3 as having two sections. These sections may be separate modules. A single module or filter may be used in place of the pair by using a time sharing arrangement in a well known manner. For purposes of clarification, the filter will be described as two sections or modules. Section 26 of filter 24 accepts the (I) phase and filter section 28 accepts the (Q) phase values from waveform map 18, and filters the data to perform spectral smoothing of the signal, as previously mentioned. Although it is preferred that filter 24 has length of 8 in order to assist in the reduction of out of band power created in the digital modulation process, such a filter creates a peak output after receiving four non-zero symbols. Thus, the ramp up time of the filter is four symbols. The ramp down time is symmetric which is also four symbol clock times. Referring to FIG. 5, filter sections 26, 28 each have eight stages or taps referred to as $X_0$ through $X_7$. It should be mentioned that even if it were a single filter, each of the components I and Q would be subjected to eight filter stages. The I or Q values, as the case may be, enter the filter at $X_0$ and move successively each symbol clock time through $X_7$, similar to a shift register. At each stage or tap, the values therein are multiplied by corresponding filter coefficients $C_0$ through $C_7$ at respective multipliers 64 through 71. The products of each of the multipliers are summed at adder 74 and output on lines 38, 40 to zero force circuit 36. Thus, a filtered output value occurs at a time corresponding to each symbol clock time, and a shift or cycle of the filter.

Figure 6:
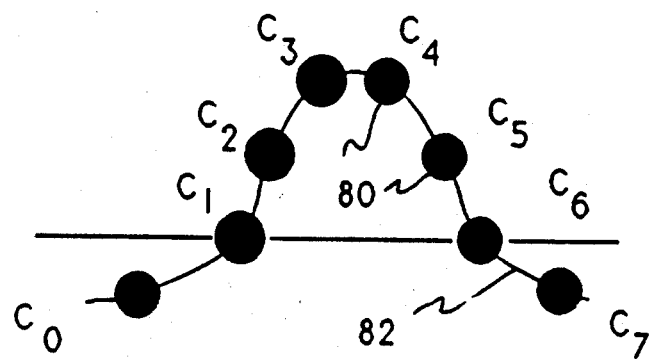
FIG. 6 is a graphical representation of a filter waveform and the corresponding coefficients of the filter of FIG. 5.

Referring to FIG. 6 the amplitude of each of the coefficients $C_0$ through $C_7$ is illustrated at 80 where each enlarged dot represents the amplitude of a corresponding filter coefficient. As seen from FIG. 6, the connection of circles 80 define a filter waveform 82; and it isn't until the fourth non-zero symbol of the filter that the peak amplitude of the multiplier coefficient is reached.

Figure 8:
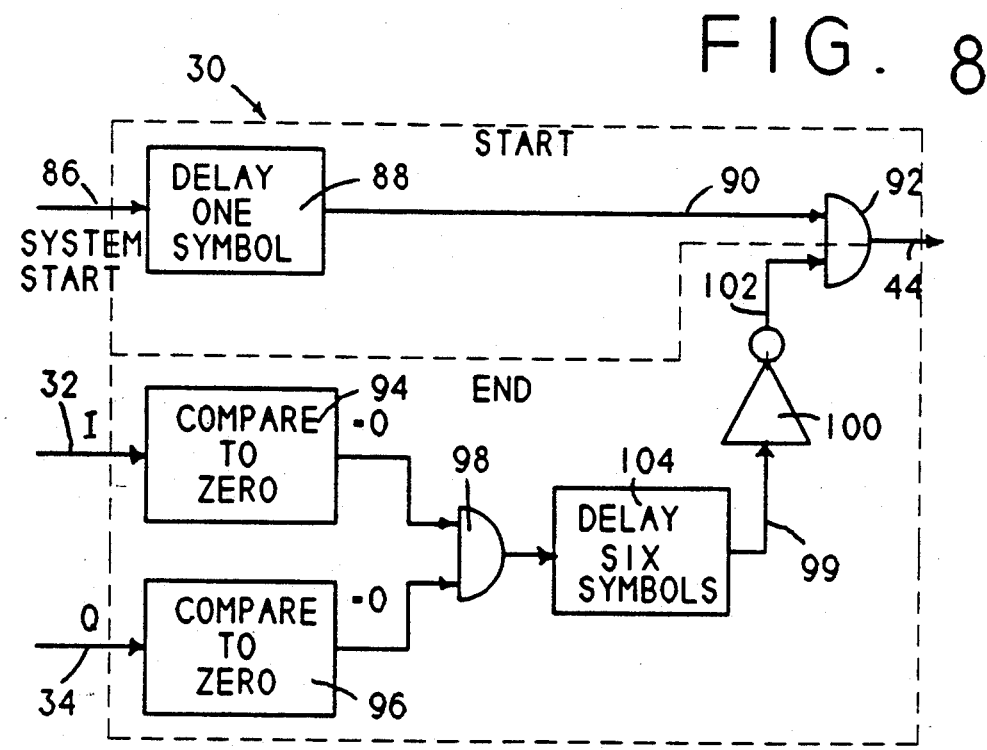
FIG. 8 is a schematic block diagram of the start/end detector of the system of the present invention.

Referring to FIG. 8, start/end burst detection circuit 30 includes an input 86 that receives a start strobe signal from a transmitter system timing module to begin transmitting. This causes the first symbol of the slot to enter the filter and provide an input to a delay circuit 88. Between bursts, the circuit 88 is outputting a logic "false" signal over line 90 to AND gate 92. Burst detection 30 also includes comparators 94 and 96 which determine whether or not an I or Q symbol on lines 32 and 34 is zero. Both of these inputs are also zero between bursts, which causes a logical "true" to be output on line 99 which is inverted by inverter 100, thus applying a logical "false" to line 102 and AND gate 92, which results in a "low" signal on line 44. After a delay of one symbol, line 90 goes logic "true", and the zero signal control is released. When one or the other of the I and Q symbols is non-zero, an output "false" occurs on line 99, which is inverted at 100 to apply a logic "true" to AND gate 92 which together with the "false" on line 90 keeps line 44 "low" for the first non-zero symbol of a burst. When AND gate 98 does not conduct, inverter 100 applies a "true" input on line 102 to AND gate 92. Thus, AND gate 92 is "low" prior to the one symbol delay by circuit 88 forcing the first symbol applied to the modulator 46 to be zero.

A "true" logic signal on both line 90 and 102 causes a logic level "high" on line 44 permitting the output of filter 24 to enter quadrature modulator 46. Thus, during the burst, the logic level remains "high" on 44. A detection of a zero value on both I and Q lines 32 and 34 causes AND gate 98 to conduct which applies on input to delay circuit 104; and after a delay of six symbols line 102 goes "false", which causes the output of AND gate to conduct a "low" signal on line 44.

Figure 7:
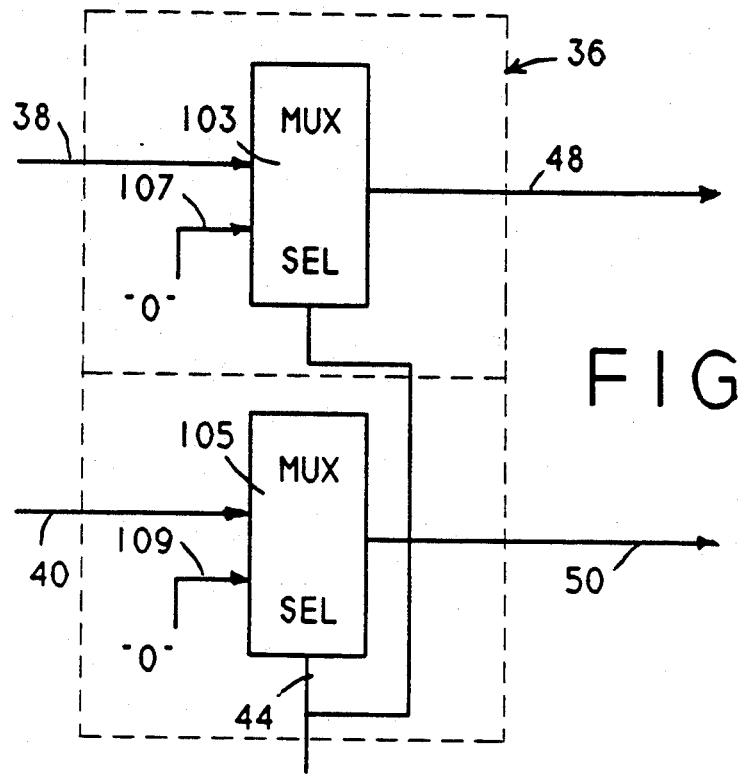
FIG. 7 is a block diagram of the zero force circuit of the system of FIG. 3 in accordance with the present invention.

Referring to FIG. 7, zero force module 36 includes multiplexer switches 103 and 105 having an input from output 38, 40 of the respective filter sections 26 and 28. Multiplexer switches 103 and 105 have an input 44 that applies either a "high" logic level or a "low" logic level signal from start/end detector 30. While the signal on 44 is "high", the multiplexer switch conducts the I and Q values on lines 48 and 50 to quadrature modulator 28. When the signal on line 44 goes "low", the output of the multiplexer switches to the modulator 46 is zero amplitude as indicated by inputs 107 and 109. The logic levels on input 44 are controlled by the start/end detection module 36 as previously described.

A more detailed description of the method and system of the present invention will be given in connection with FIGS. 9, 10, and 11 in describing the overall operation of the system.

Figure 9:
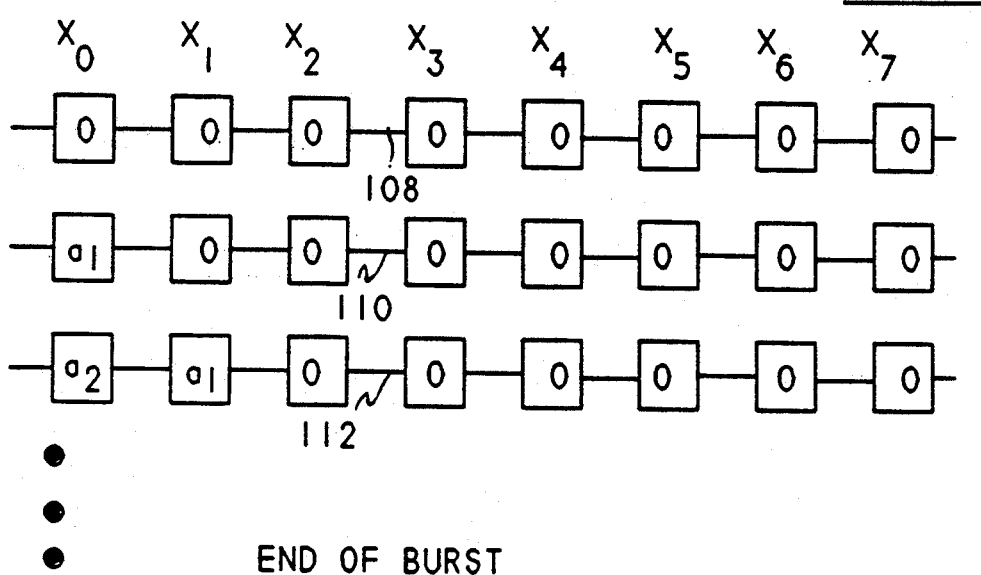
FIG. 9 is a graphical illustration of the operating states of the filter taps of FIG. 6 during detection of the start and end of a slot.
Figure 9:
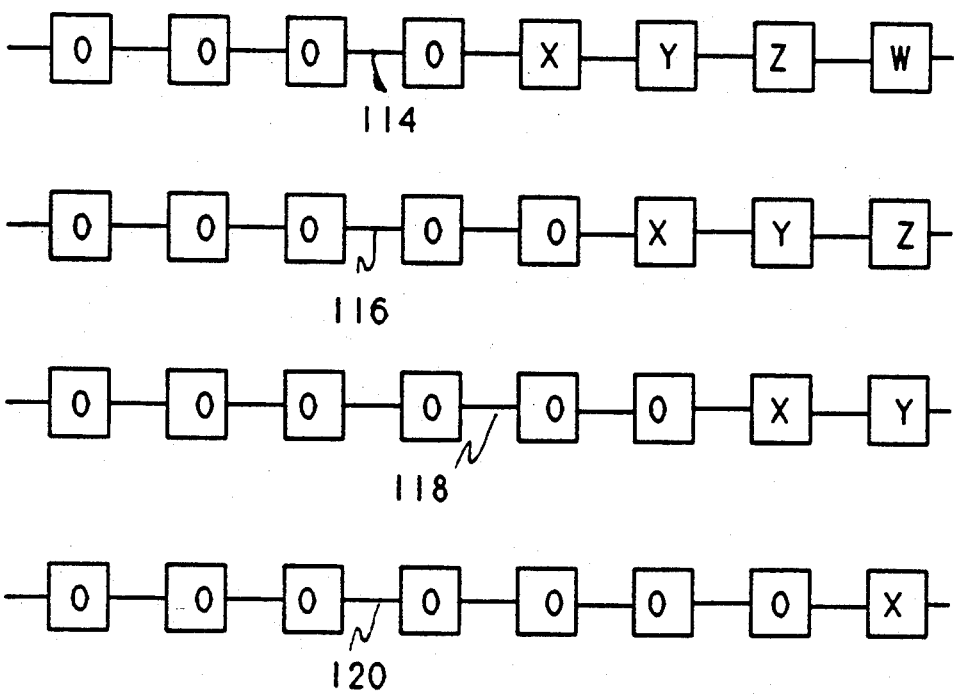

Between each burst, the filter taps $X_0$ through $X_7$ are all set to zero as shown at tap line 108 of FIG. 9, thus, providing a zero amplitude RF power output. Upon entry of the first non-zero value to tap $X_0$, the zero values in the filter all shift to the left as viewed by taps 110 of which now provides a signal having a value of the product of $C_0 \cdot a$, at the output of the filter. However, since the start/end detection module recognizes this non-zero value as the beginning of a burst, input 44 goes low, which in turn causes multiplexer switches 103 and 105 to output a zero value to modulator 28, thus, providing no RF input to upconverter 54 and power amplifier 58. Upon entry of a second non-zero output $a_2$, value a, shifts to the left as shown at 66 which provides a filter output value of $a \cdot C$ & $a_2 \cdot C_0$, the signal on line 44 goes high which permits multiplexer switches 103 and 105 to output the filter values to the upconverter 54 and power amplifier 58. Upon entry of the non-zero value $a_4$ (not shown) the power output peaks; and the burst continues until the end. The addition of values which decreases the number of zero values in the taps and finally eliminates all the zero values in the filter does not cause an appreciable difference in the peak value of the power output. Toward the end of the burst, the first four taps $X_1$, $X_2$, $X_3$ and $X_4$ successively fill with zero values as shown at tap line 114, which defines the end of the burst with an output that corresponds to the sum of $C_4 X + C_5 Y + C_6 Z + C_7 W$. This is the last "peak" and first ramp of the signal. Upon entry of the fifth zero value, as shown by the line of taps 116, the signal ramping down as required by communication standards with the output of the filter decreasing to the sum of $C_6 X + C_7 Y + C_8 Z$. Upon entry of the sixth zero value to the filter as shown by tap line 118, the output decreases to the sum of $X \cdot C_6 + Y \cdot C_7$, which is the final ramp down output signal permitted by the official standards. Upon entry of the seventh zero value as shown by tap line 120, the start/end detection module 36 causes input line 44 to go low which causes multiplexer switches 103 and 105 to output a zero value, thus preventing $X \cdot C_7$ from being applied to quadrature modulator 46.

Figure 10:
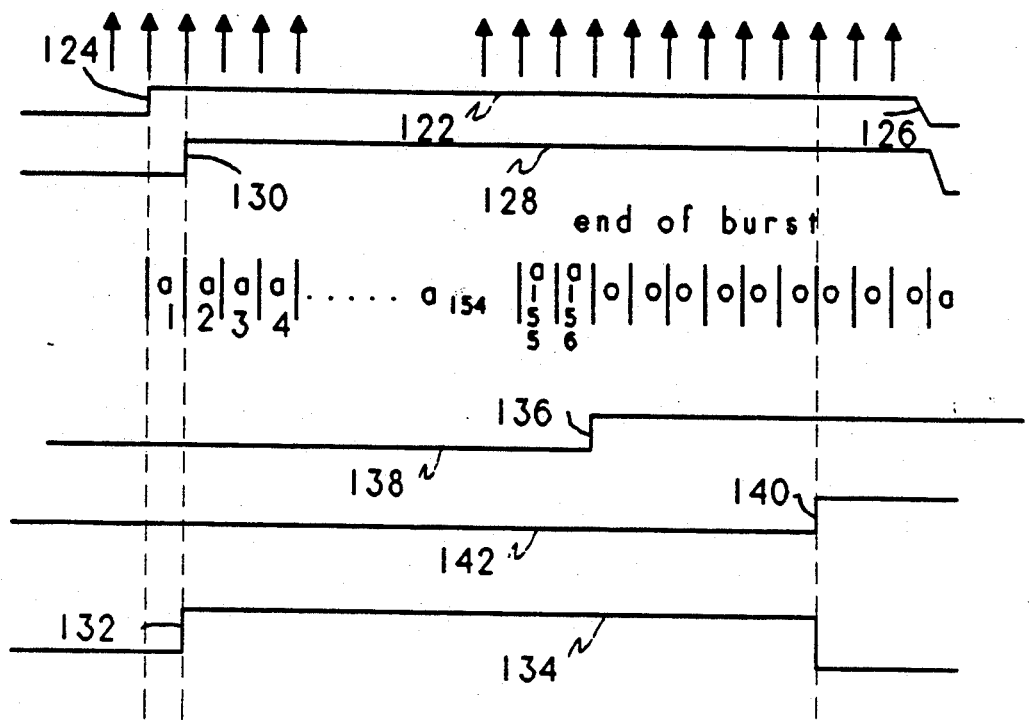
FIG. 10 is a timing diagram depicting the operation of the start/end detection of the system of the present invention.

Referring to FIG. 10, timing line 122 of each slot or burst depicts a start signal at 124 and an end signal at 126 at the end of each burst. At the beginning of each burst, the zero signal time line 128 indicates at 130 that it permits the quad modulator 46 to receive $a_2$ as the first ramp up clock symbol time after forcing the output corresponding to $a_1$ to zero; and the zero force output of the zero force module goes "high" at 132 of time line 134. Upon detection of the first zero magnitude symbol as indicated at 136 of time line 138, and after a delay of six symbol clocks, the zero force signal is output as shown at 140 of time line 142 forcing the output corresponding to $a_{156}$ to zero after reaching tap $X_7$.

Figure 11:
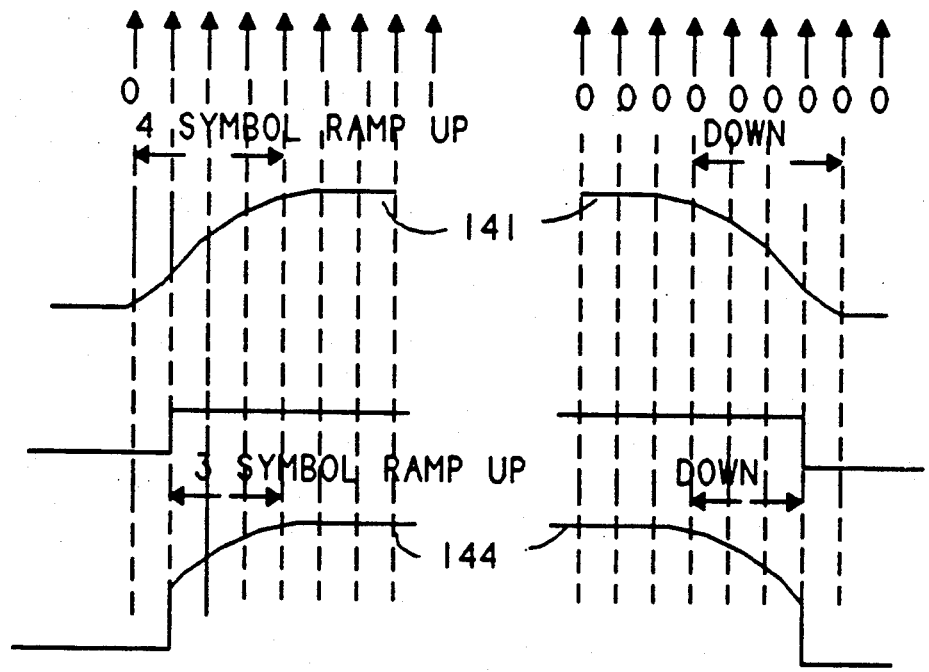
FIG. 11 is a graph illustrating a comparison of the ramp voltage at the beginning and end of a burst both with and without the present invention.

In summary, and referring to FIG. 11, after the start of a burst, non-zero I and Q data enters the FIR filter, and the filter begins to produce power out. As indicated by FIG. 4, for a length N filter, the first symbol will peak midway between the first and last tap or in other words N/2. Similarly at the end of a burst the FIR filter is filled with zeros after the last data is transmitted. For an N length filter the signal will go to zero N/2 symbol times after the last symbol peaked at the FIR output.

For certain applications the optimum operator and cell standard requires the ramp-up/down times to be 3 symbols in length. Thus, it would require an FIR of length six to meet these ramp times. The standard also calls out for other specifications such as spectral limitations and modulation accuracy to be met during the transmission of the burst, which require filter lengths of at least eight. The ramp times of these longer filters would not meet the standards without limiting the ramp time to three clocks symbols.

Referring to FIG. 11, the output power profile of a typical transmitter with a length eight FIR filter performing waveshaping on the input I and Q values without the benefit of the present invention is referenced to as 141. This profile would not satisfy the standard for ramp times. The figure also shows the output power profile 144 of the same transmitter, but with the addition of the present invention. This profile does satisfy the standards for ramp times, and also meets the spectral response limitations and modulation accuracy.

At the end of the burst, the control circuit detects the end of transmit burst when it sees a zero magnitude I/Q value enter the first FIR tap value. The FIR filter continues to run, but after its sixth output cycle, the output of the FIR is forced to zero. This number is six, because after the zero value is detected, it will take three symbols for the last non-zero value to "peak", then three additional symbols of ramp-down are allowed.

Having described the presently preferred system embodiment and method of the invention, additional advantages and modifications will readily occur to those skilled in the art. For example, the system and method could be used in a central station, a filter having more than eight taps may be used, and more than one symbol may be forced to zero to obtain the optimum ramping, for example. Accordingly, the invention in its broader aspects is not limited to specific details, representative apparatus and illustrative examples shown and described. Departure may be made from such details without departing from the spirit or scope of the general inventive concept as defined by the appended claims and their equivalents.

What is claimed is:

1. A system for transmitting successive bursts of digital information containing multiple symbols, each burst ramping up from zero power output to a peak power output and ramping down from the peak power output to zero power output at a respective beginning and ending of each burst, said system comprising:

a digital data source for generating data corresponding to at least one of coded voice and control information;

symbol mapping means coupled to the digital source data for generating a series of symbols having in-phase (I) and quadrature phase (Q) components corresponding to the generated data;

filtering means coupled to the symbol mapping means for spectrally filtering the I and Q symbol components;

detecting means coupled to the filtering means for detecting a start of a ramp up and a ramp down of each burst;

zero forcing means coupled to the filtering means and the detecting means for forcing predetermined symbols to zero value to control ramping up and ramping down of the power output;

modulating means coupled to the zero forcing means for modulating the filtered symbols of each burst; and means including a power amplifier for outputting modulated symbols.

2. The system transmitter of claim 1 wherein each generated digital data symbol includes no more than two bits.

3. The system transmitter of claim 1 wherein the symbol mapping means includes means for mapping the symbols into rectangular coordinates corresponding to one of at least eight possible phases.

4. The symbol of claim 1 wherein the filtering means comprises a finite impulse response filter having at least eight taps.

5. The system of claim 1 wherein the detecting means comprises first means responsive to a non-zero I and Q value entering the filter means for detecting the start of a burst and second means responsive to a zero magnitude I and Q value entering the filter means for detecting the end of a burst.

6. The system of claim 5 wherein the zero forcing means comprises means responsive to the start detecting means for forcing a first non-zero value entering the forcing means to a zero value, means responsive to the entry of a second non-zero value for releasing the forcing of the filtered values to a zero value, and means responsive to a predetermined number of zero symbols entering the forcing means subsequent to the release of the zero forcing means, for forcing the last non-zero symbol of each burst to zero.

7. A mobile cellular transmitter for transmitting successive frames of digital information, each frame containing a burst of RF energy, each burst containing multiple symbols and ramping up from zero power output to a peak power output and ramping down from the peak power output to zero power output at a respective beginning and ending of each burst, said transmitter comprising:
 a digital data source for generating data corresponding to at least one of coded voice and control information;
 symbol mapping means coupled to the digital source data for generating a series of symbols having in-phase (I) and quadrature phase (Q) components corresponding to the generated data;
 a finite impulse response filter having at least eight taps coupled to the symbol mapping means for spectrally filtering the I and Q symbol components;
 detecting means coupled to the filter for detecting a start of a ramp up and a ramp down of each burst;
 a zero forcing circuit coupled to the filter and the detecting means for forcing predetermined symbols of each burst to zero value to control ramping up and ramping down of the power output;
 a quadrature modulator coupled to the zero forcing circuit for modulating the sum of the output symbols of each burst; and
 means including a power amplifier for radiating the modulated symbols.

8. A method for transmitting successive bursts of an RF power output, in a communication system, comprising the steps of:
 generating digital data corresponding to at least one of coded voice and control information;
 generating in phase and quadrature phase components corresponding to the generated digital data;
 ramping up the RF power output at a start of each burst to a peak power corresponding to clock time of a predetermined number of non-zero symbols; and ramping down the RF power output from peak power corresponding to the clock time of a predetermined number non-zero value symbols at an end of each burst;
 detecting the start symbol and end symbol of each burst; and
 forcing to zero power output at least the first and last symbol of each burst to decrease the ramping time of the power output.

9. The method of claim 8 wherein the step of forcing to zero output power includes forcing the output of a finite impulse response filter to zero power.

10. The method of claim 9 wherein the step of detecting the start symbol and end symbol of each burst includes the substeps of detecting a first non-zero value in a first tap of the filter at a time when remaining taps of the filter are at zero value, and detecting in a final tap of the filter a non-zero value at a time when remaining taps of the burst are zero.

11. The method of claim 10 wherein the step of detecting a non-zero value in a final tap of the filter includes the step of detecting a plurality of zero values in a corresponding number of taps entering the filter.

12. A system for modulating the transmission power level of successive bursts of digital information containing multiple symbols, each burst ramping up from zero power output to a peak power output and ramping down from the peak power output to zero power output at a respective beginning and ending of each burst during a predetermined number of symbol time periods, the system comprising:
 a waveform map for generating a series of symbols having in-phase (I) and quadrature phase (Q) components corresponding to some data;
 a filter coupled to the waveform map for spectrally filtering the I and Q symbol components, the filter being operative to ramp up from zero power to peak power and ramp down from peak power to zero power at a respective beginning and end of each burst during a number of symbol time periods greater than said predetermined number of symbol time periods;
 a detector coupled to the filter for detecting a start of a ramp up and a ramp down of each burst;
 a zero forcing circuit coupled to the filter and the detector for forcing predetermined filtered symbols to zero value to cause the ramping up and the ramping down of the power output to occur during the predetermined number of symbol time periods.

13. The system of claim 12 wherein the waveform map comprises means for mapping the symbols into rectangular coordinates corresponding to one of at least eight possible phases.

14. The system of claim 12 wherein the filter comprises a finite impulse response filter having at least eight taps ($X_0$–$X_7$).

15. The system of claim 12, wherein the zero forcing circuit comprises first means responsive to a non-zero I and Q value entering the circuit for detecting the start of a burst and second means responsive to a zero magnitude I and Q value entering the circuit for detecting the end of a burst.

16. The modulator of claim 12 wherein the zero forcing circuit comprises means responsive to the start detector for forcing a first non-zero value entering the circuit to a zero value;
 means responsive to the entry of a second non-zero value for releasing the forcing of the filtered values to a zero value; and
 means responsive to a predetermined number of zero value symbols entering the circuit subsequent to the release of the zero forcing means, for forcing the last non-zero symbol of each burst to zero.

17. A method for modulating the transmission power level of successive bursts each burst comprising a sequence of symbols, the method comprising:
 generating in-phase and quadrature phase components corresponding to data;
 ramping up the power output at the start symbol of each burst to a peak power corresponding to the clock time of a predetermined number of non-zero symbols;
 ramping down the power output from peak power corresponding to the clock time of a predetermined number of non-zero value symbols at the end symbol of each burst;
 detecting the start symbol and end symbol of each burst; and
 forcing to zero power output at least the first and last symbol of each burst to decrease the ramping time of the power output.

18. The method of claim 17 comprising forcing the first non-zero symbol of each burst to zero.

19. The method of claim 17 comprising detecting a predetermined number of zero symbols subsequent to a non-zero symbol, and forcing said non-zero symbol to zero at the end of each burst.

* * * * *

UNITED STATES PATENT AND TRADEMARK OFFICE
CERTIFICATE OF CORRECTION

PATENT NO. : 5,282,226

DATED : January 25, 1994

INVENTOR(S) : David N. Critchlow

It is certified that error appears in the above-identified patent and that said Letters Patent is hereby corrected as shown below:

In Column 8, claim 2, line 1, delete "transmitter".

In Column 8, claim 3, line 1, delete "transmitter".

Signed and Sealed this

Twentieth Day of December, 1994

Attest:

BRUCE LEHMAN

*Attesting Officer*  *Commissioner of Patents and Trademarks*